ns

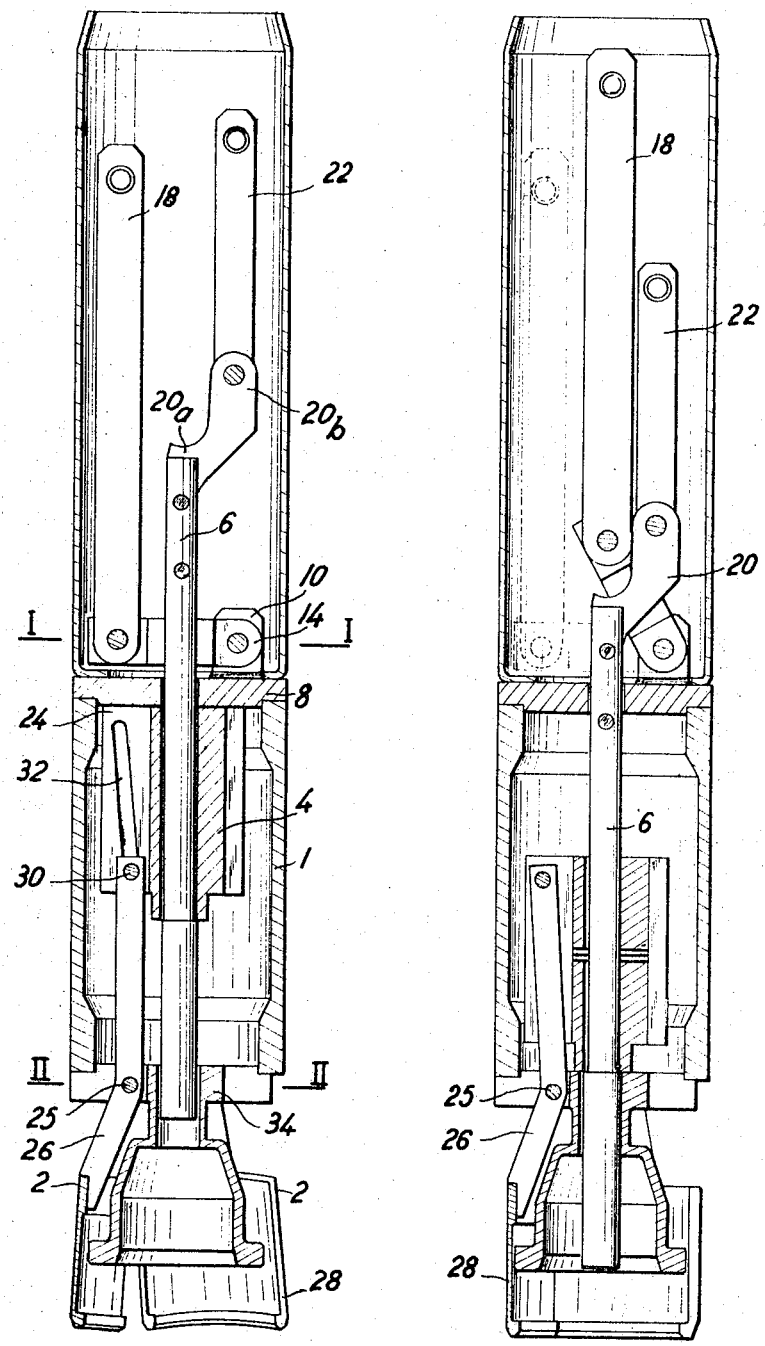

United States Patent Office 3,295,883
Patented Jan. 3, 1967

3,295,883
HANDLING GRAB
Gérard Dupuy, Paris, and André Tarabella, Palaiseau, France, assignors to Commissariat a l'Energie Atomique, Paris, France
Filed Jan. 11, 1965, Ser. No. 424,692
Claims priority, application France, Jan. 13, 1964, 960,138
6 Claims. (Cl. 294—90)

The present invention relates to a handling grab which makes it possible to displace a load from one point to another without any danger of disengagement during operation, since the opening of the claws can only be initiated when the displacement of the grab as a whole is completed.

The object of this invention is to provide a handling grab of the type comprising a hollow body for supporting the gripping members and a slide-block which is axially movable within said hollow body and which is adapted to control the movement of said gripping members between a position of engagement with and disengagement from the load, and two abutment members for arresting the movement of the slide-block relatively to the hollow body in each of the end positions of said slide-block, wherein said handling grab comprises an articulated system for controlling the displacement of the hollow body and moving the slide-block into the bottom position thereof, a rod for controlling the movement of the slide-block alone within the interior of the hollow body and the displacement of the grab which is drawn with the slide-block to the top position thereof, said rod being adapted to pass freely through the articulated system but is arrested in the bottom position by said articulated system at the time of upward movement of said system from the rest position to the position of withdrawal of the grab.

According to a preferred form of embodiment, the gripping members are pivotally mounted on the hollow body and the slide-block is pierced with elongated slots which are inclined to the axis of said slide-block and which each cooperate with a stud provided on the extremity of one of the gripping members.

Any accidental displacement of the gripping members during the movement of travel of the grab is thus prevented, whether the articulated system moves the entire grab unit whilst the rod is arrested in the bottom position or whether the rod controls the movement of the grab, the articulated system having a certain freedom of vertical motion in which its movement does not result in that of the hollow body. The load can therefore be handled without danger and transported with complete safety.

A number of advantages and characteristics of the invention will in any case be brought out by the following description of one form of embodiment which is given by way of example and illustrated in the accompanying drawings, in which:

FIG. 1 is a longitudinal sectional view of a handling grab in the disengaged position.

FIG. 2 is also a sectional view of the same handling grab in the engaged position.

Figure 3:
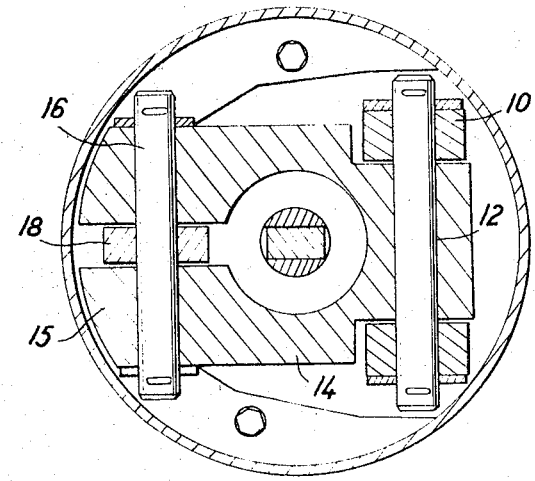
FIG. 3 is a sectional view on the line I—I of FIG. 1.
Figure 4:
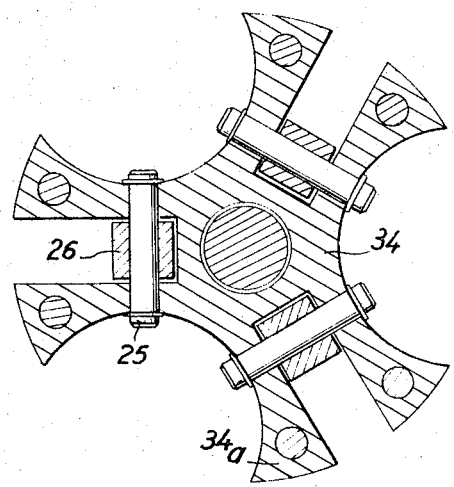
FIG. 4 is a sectional view on the line II—II of FIG. 1.

The handling grab according to the invention consists, as shown in the drawings, of a hollow body 1 on which are pivotally mounted gripping members 2, the pivotal movement of which is controlled by the axial displacement of a slide-block 4 which is adapted to move within the body 1. The said body is closed at the top by an end-plate 8 on one side of which is provided a bearing bracket 10 (as shown in FIG. 3). A yoke 14 is pivotally mounted in said bearing-bracket about a pin 12 and the arms 15 of said yoke are adapted to carry a pin 16 to which is pivoted a connecting-arm 18 placed between said arms. In the rest position, the yoke 14 rests on the end-plate 8 whilst the connecting arm 18 is parallel to the axis of the body 1, as shown in FIG. 1.

A rod 6 which traverses the yoke 14 at the center of this latter and passes freely through the end-plate 8 is integral with the slide-block 4. Said rod terminates on the other side of the yoke 14 in an elbowed arm 20 which is substantially L-shaped, one extremity 20a of which is attached to the rod 6 at right angles to the axis of this latter whilst the other extremity 20b of said elbowed arm is parallel to said rod 6 and is coupled by means of a connecting arm 22 to a device (not shown) for controlling the movement of the slide-block 4.

The slide-block referred-to is provided with longitudinal fins 24, which are three in number, for example, in the case of the figure and which have a U-section, there being mounted in said fins the extremities of the gripping members 2 which are pivotally mounted at 25 on the hollow body 1.

The gripping members 2 consist of elbowed levers 26 which are provided at one end thereof with claws 28 whilst the other end thereof is adapted to slide within the fins 24 by a virtue of studs 30 movable within elongated slots 32 which are pierced in said fins and which are inclined to the axis of the grab in such manner that the displacement of the studs 30 initiates the pivotal motion of the levers 26 about the fulcrum-pins 25 and produces the closing movement or opening movement of the claws 28 either from the position of disengagement from the load or load-releasing position shown in FIG. 1 to the position of engagement with the load or load-gripping position shown in FIG. 2, or conversely.

The lower portion of the body 1 is limited by an end-plate 34, the cross-section of which is similar to that of the slide-block 4 and which is accordingly provided with U-shaped fins 34a, the levers 26 being pivotally mounted on the fulcrum-pins 25 which are fixed in said fins. A central bore is provided to permit the rod 6 to pass therethrough without friction but nevertheless has a sufficiently small diameter to ensure that the movement of the slide-block 4 is arrested by the plate 34. At the opposite end, the slide-block comes into abutment against the end-plate 8. In this position (as shown in FIG. 1), the rod 6 is lifted, the studs 30 are located at the bottom end of the elongated slots 32 and the claws 28 are in the outwardly withdrawn position with a view to releasing the load. A tractive effort applied on the connecting-arm 22 is accompanied by the upward movement of withdrawal of elbow 20, rod 6 and slide-block 4 and the slide-block lifts the end-plate 8, thereby producing the displacement of the entire grab which can thus be brought into the desired position without any modification of the movement of the claws. A jerk on the connecting-arm 18 could have the effect of lifting this latter which would thus draw with it the yoke 14, but this movement would be arrested by the abutting contact of said connecting-arm 18 against the rod 6 in the top position thereof before producing any influence on the displacement of the body 1 and consequently of the grab.

The releasing of the connecting-arm 22 while the connecting-arm 18 remains motionless allows the rod 6 to move downwards and draw with it the slide-block 4, thereby displacing the elongated slots 32 and moving the studs 30 away from said rod 6, so initiating the inward movement of the claws 28 up to the position shown in FIG. 2 wherein the studs are located at the top ends of the elongated slots 32 and the slide-block 4 is applied against the plate 34. The rod 6 is then in its bottom position and the claws are engaged on the load. In order to displace the load, the connecting-arm 18 is drawn upwards, consequently leaving the position shown in broken lines in FIG. 2, and lifts the yoke 14 until the lower extremity of said connecting-arm 18 which is pivotally coupled to said yoke comes into abutting contact with the extremity 20b of the elbow 20, that is to say up to the moment when said connecting-arm 18 is located in the line of extension of the rod 6, then draws with it the combined assembly consisting of hollow body 1, slide-block 4 and claws 28 which are clamped on the load. The handling grab can then be moved in all directions which are necessary for the transportation of the load, the slide-block 4 and the rod 6 being maintained in the load-gripping position under the action of their own weight.

However, if any incident or error of operation were to cause an upward movement of said rod 6, the extremity 20a of the elbow 20 would come up against the connecting-arm 18 in its lifting movement and would thus be arrested by this latter in a position which would still correspond to the bottom position of the rod 6. Inasmuch as the small distance of travel thus covered is not sufficient to permit the opening of the claws, said claws would therefore remain firmly engaged with the load.

Disengagement of the load is possible only after the connecting-arm 18 has returned to its rest position, this return movement being permitted by releasing its operating device after locking the device which operates the connecting-arm 22. This operation is carried out in a very simple manner after the load has been placed in the position which it is intended to occupy and the downward movement of the grab is stopped. The connecting-arm 22 and the rod 6 are no longer subjected to the weight of the load and a slight downward displacement of the connecting-arm 18 allows this latter to return to its rest position and to disengage the elbow 20. The connecting-arm 22 can thus be lifted, drawing with it the rod 6 and slide-block 4, thus opening the grab 2 and releasing the load.

Highly reliable control of the handling operation is thus ensured without any danger of faulty operation or accidental disengagement of the load. A grab as thus designed is particularly well suited to the handling of dangerous loads and especially to the handling of nuclear reactor fuel elements.

It will in any case be readily understood that a number of different modifications could be made in the form of embodiment which has just been described without thereby departing from the scope of this invention.

For example, the shape of the slide-block could be different and the elongated slots could be replaced by a cam or any like system. Moreover, the gripping members could consist of either tongs, balls, or any other member of the same type.

What we claim is:

1. Handling grab comprising a hollow body, gripping members mounted on said hollow body, a slide-block which is axially movable within said hollow body and which is arranged to control the movement of said gripping members, said hollow body having an abutment member at each end thereof for arresting the movement of said slide-block relative to said hollow body in each of the two end positions of said slide-block, an articulated system mounted on one of said abutment members for controlling the displacement of the hollow body, a rod arranged to control the movement of the slide-block within the interior of the hollow body and the displacement of the grab when the slide-block is drawn to the top position thereof, said rod being adapted to pass freely through the articulated system but is arrested in the bottom position by said articulated system at the time of upward movement of said system from the rest position to the load lifting position of the grab.

2. Handling grab as defined in claim 1, in which said articulated system comprises a yoke of which one end is pivotally mounted on the hollow body and the other end is pivotally coupled to a control connecting-arm which is parallel to the axis of the grab, the arms of the yoke being placed on each side of the slide-block control rod in such manner as to provide a clearance which permits the inclination of said yoke up to the point of contact of said connecting-arm with said rod.

3. Handling grab as defined in claim 1, in which said rod is maintained in abutment against the extremity of the connecting-arm which is lifted for the purpose of displacing the grab.

4. Handling grab as defined in claim 3, including an elbowed arm at the extremity of the slide-block control rod which is designed for the purpose of locking said control rod in the bottom position thereof and which has two perpendicular extremities, one extremity of said elbowed arm being parallel to the rod and coupled to a driving member for limiting the lateral displacement of the connecting-arm to a position in which the grab is withdrawn in the line of extension of the rod and the second extremity of said elbowed arm being perpendicular to the first and designed to come into abutment against said connecting-arm and thus lock the rod and slide-block in position.

5. Handling grab as defined in claim 1, including elongated slots in the movable slide-block which are inclined to the axis of said slide-block, and a stud carried by the extremity of each gripping member and movable within its respective elongated slot.

6. Handling grab as defined in claim 1, in which said abutment members at the extremity of the hollow body each comprises an end-plate for limiting the displacement of the slide-block, an opening which permits the rod of said slide-block to pass through each of said end-plates and recesses for the pivotal movement of the gripping members within one of said end-plates.

References Cited by the Examiner

UNITED STATES PATENTS 3,137,397 6/1964 Nicoll _____ 294—116 X
3,198,570 8/1965 Sines _____ 294—116 X GERALD M. FORLENZA, Primary Examiner.

G. F. ABRAHAM, Assistant Examiner.